(12) United States Patent
Booman et al.

(10) Patent No.: US 6,216,169 B1
(45) Date of Patent: *Apr. 10, 2001

(54) GENERATING REPORTS USING DISTRIBUTED WORKSTATIONS

(75) Inventors: Gordon A. Booman, Berlin; Robert S. Diebboll, Lincoln; Ferdinand Engel, Northboro; Arthur P. Hamlin, Stow; Stephen F. McKellar, Milford, all of MA (US)

(73) Assignee: Concord Communications Incorporated, Marlboro, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,911

(22) Filed: Oct. 6, 1997

(51) Int. Cl.[7] ............................................. G06F 15/16
(52) U.S. Cl. .................................... 709/246; 709/223
(58) Field of Search .................... 709/220, 221, 709/223, 224, 235, 201, 246; 345/440; 370/245; 713/203

(56) References Cited

U.S. PATENT DOCUMENTS

| | | | |
|---|---|---|---|
| 5,193,152 | * | 3/1993 | Smith .................................. 709/230 |
| 5,243,543 | | 9/1993 | Notess . |
| 5,251,152 | | 10/1993 | Notess . |
| 5,535,335 | * | 7/1996 | Cox et al. ........................... 709/231 |
| 5,615,323 | * | 3/1997 | Engel et al. ......................... 345/440 |
| 5,732,218 | * | 3/1998 | Bland et al. ......................... 709/224 |
| 5,758,083 | * | 5/1998 | Singh et al. ......................... 709/223 |
| 5,781,735 | * | 7/1998 | Southard ............................. 709/224 |
| 5,793,951 | * | 8/1998 | Stein et al. ........................... 713/202 |
| 5,812,529 | * | 9/1998 | Czarnik et al. ...................... 370/245 |
| 5,870,555 | * | 2/1999 | Pruett et al. ......................... 709/223 |
| 5,905,868 | * | 5/1999 | Baghai et al. ....................... 709/224 |
| 6,003,090 | * | 12/1999 | Puranik et al. ...................... 709/235 |

FOREIGN PATENT DOCUMENTS

| | | | |
|---|---|---|---|
| 2248325A | * | 4/1992 | (GB) . |
| 2248370A | * | 4/1992 | (GB) . |

OTHER PUBLICATIONS

Bines, Jonathan, "HP's Openview Network Node Manager: A Distributed Management Solution," *Tool Spotlight*, Hurwitz Group, Inc., Dec. 1996, pp. 4–13.

Concord, "Trakker® Network Health Illustrated" brochure, 1994.

Concord, "Trak/Report™ Illustrated" brochure, 1995.

* cited by examiner

*Primary Examiner*—Ayaz Sheikh
*Assistant Examiner*—Patrice Winder
(74) *Attorney, Agent, or Firm*—Fish & Richardson P.C.

(57) ABSTRACT

The invention features methods of, and systems for generating a report that depends on data stored in a plurality of remote workstations. The methods and systems involve at least some of the following steps: sending a request from a master workstation to the remote workstations specifying a group name and a named function; identifying data stored within each of the remote workstations belonging to a group specified by the group name; operating on the identified data within each of the remote workstations according to an algorithm specified by the named function to generate an output for each remote workstation; returning the output from each remote workstation to the master workstation; and consolidating the outputs at the master workstations to generate the report.

31 Claims, 6 Drawing Sheets

GENERATING REPORTS USING DISTRIBUTED WORKSTATIONS

BACKGROUND OF THE INVENTION

The invention relates to a method and system for processing data stored in multiple workstations.

Computer workstations can be used to store large amounts of data. Often, a user desires information that involves processing a subset of data stored on multiple workstations. Generating and displaying the desired information is referred to as a "report". To generate a report, data stored on multiple workstations is sent to a central workstation to process the data. For large amounts of data the central workstation must be very powerful to generate the report in a reasonable time.

Network management is an example of the situation described above. Networks link computers together to allow them to exchange information and communicate with each other over a distance. The networks can be quite large and complex, involving many components and devices that are essential for the services they provide. The tasks of maintaining the network, adding computer resources when needed, reconfiguring the network to support changing patterns of usage and greater user demands, and solving the problems which occasionally occur are typically the responsibility of a network manager. To effectively and efficiently carry out those responsibilities, the network manager must be able to quickly determine how well even the most remote sections of the network are performing and to detect the occurrence of problems or a deterioration in performance that hints at the beginning of more serious problems.

To assist the network manager, elements of the network themselves, or dedicated monitoring devices connected to or embedded within the elements, maintain information on data passing (e.g., volume of data, number of errors) through the elements. A workstation retrieves that information and processes it to generate a report on the performance of the network. For example, reports can list the portions of the network having the greatest volume of data traffic over a specific interval of time. Often, the network manager further specifies that the report only include data relating to selected elements of the network, for example, data relating to communication between the computers belonging to the same company or a department within a company.

Network management is one of many examples where large amounts of data need to be processed efficiently in order to generate desired information in a timely manner.

SUMMARY OF THE INVENTION

The invention features techniques for processing data stored in multiple workstations in order to generate and display information desired by a user, i.e., generate a report. In response to a request, each of the workstations identifies data relevant to the report and processes that data. Then, one of the workstations, or a separate workstation, receives and consolidates all of the processed data and generates the report.

In general, in one aspect, the invention features methods of, and systems for, operating a workstation that stores data on a plurality of elements. The methods and systems involve the steps of: receiving at the workstation a request specifying a group name; identifying the data stored in the workstation relating to the elements belonging to a group specified by the group name; and sending the identified data to another workstation.

In general, in another aspect, the invention features methods of, and systems for, operating a workstation that stores data on a plurality of elements. The methods and systems involve the steps of: receiving at the workstation a request specifying a named function; processing data stored in the workstation according to an algorithm that is specified by the named function to generate an output; and sending the output to another workstation.

In general, in another aspect, the invention features methods of, and systems for, operating a workstation that stores data on a plurality of elements. The methods and systems involve the steps of: receiving at the workstation a request specifying a group name and named function; identifying the data stored in the workstation relating to the elements belonging to a group specified by the group name; operating on the identified data according to an algorithm that is specified by the named function to generate an output; and sending the output to another workstation. In a related aspect, the invention features computer readable media storing a program that causes a digital processor to perform these steps. In another related aspect, the invention features workstations that include: a processor; and a memory storing the data, a program that causes the processor to perform these steps, a list of the elements belonging to the group name, and the algorithm. In preferred embodiments, the algorithm is stored in the workstation.

In general, in another aspect, the invention features methods of, of systems for, operating a master workstation to generate a report that depends on data stored in a plurality of remote workstations. The methods and systems involve the steps of: sending a request from the master workstation to the remote workstations specifying a group name and a named function; and processing responses to the request from the remote workstations to generate the report. In a related aspect, the invention features computer readable media storing a program that causes a digital processor to perform these steps. In another related aspect, the invention features master workstations that include: a processor; and a memory storing a program that cause the processor to carry out these steps, the group name, and the named function.

In general, in another aspect, the invention features methods of, and systems for, generating a report that depends on data stored in a plurality of remote workstations. The methods and systems involve the steps of: sending a request from a master workstation to the remote workstations specifying a group name and a named function; identifying data stored within each of the remote workstations belonging to a group specified by the group name; operating on the identified data within each of the remote workstations according to an algorithm specified by the named function to generate an output for each remote workstation; returning the output from each remote workstation to the master workstation; and consolidating the outputs at the master workstations to generate the report. In a related aspect, the invention features computer readable media storing a program that causes a digital processor to perform these steps.

Preferred embodiments may include any of the following features. The algorithm involves comparing data to a user-specified threshold value, determining weighted averages, or sorting aggregated values in order of size. The compiling step involves vector addition, matrix addition, or sorting aggregated values in order of size.

In general, in another aspect, the invention features systems for generating a report. The system includes: a plurality of remote workstations that each store data on a plurality of elements; and a master workstation that includes a memory storing a program that causes a processor in the master workstation to carry out the steps of: sending a request to all of the remote workstations specifying a group name and a named function, and consolidating processed data received from the remote workstations in response to the request. Each of the remote workstations includes a memory storing a program that causes a processor in the remote workstation to carry out the steps of: receiving the request, identifying stored data relating to elements belonging to a group specified by the group name, processing the identified data according to an algorithm specified by the named function, thereby producing the processed data, and sending the processed data to the master workstation.

In any of the above aspects, preferred embodiments involve data that is network management data or computer performance data.

The invention has the following advantages. The invention distributes the processing of data over many workstations thereby reducing the time required to generate the report. Moreover, larger volumes of data can be processed simply by increasing the number of workstations, i.e., the invention scales with the volume of data to be processed. Also, the invention reduces the volume of data sent from the workstations storing the data to the workstation generating the report. This is because the workstations storing the data partially process the data and then only send the partially processed data (which is more compact) to the workstation generating the report. Furthermore, the processed data used to generate the report is consolidated into a single view or any other form (e.g., multiple views) desired by the user.

Other features and advantages of the invention will be apparent from the following detailed description, and from the claims.

DETAILED DESCRIPTION

Figure 1:
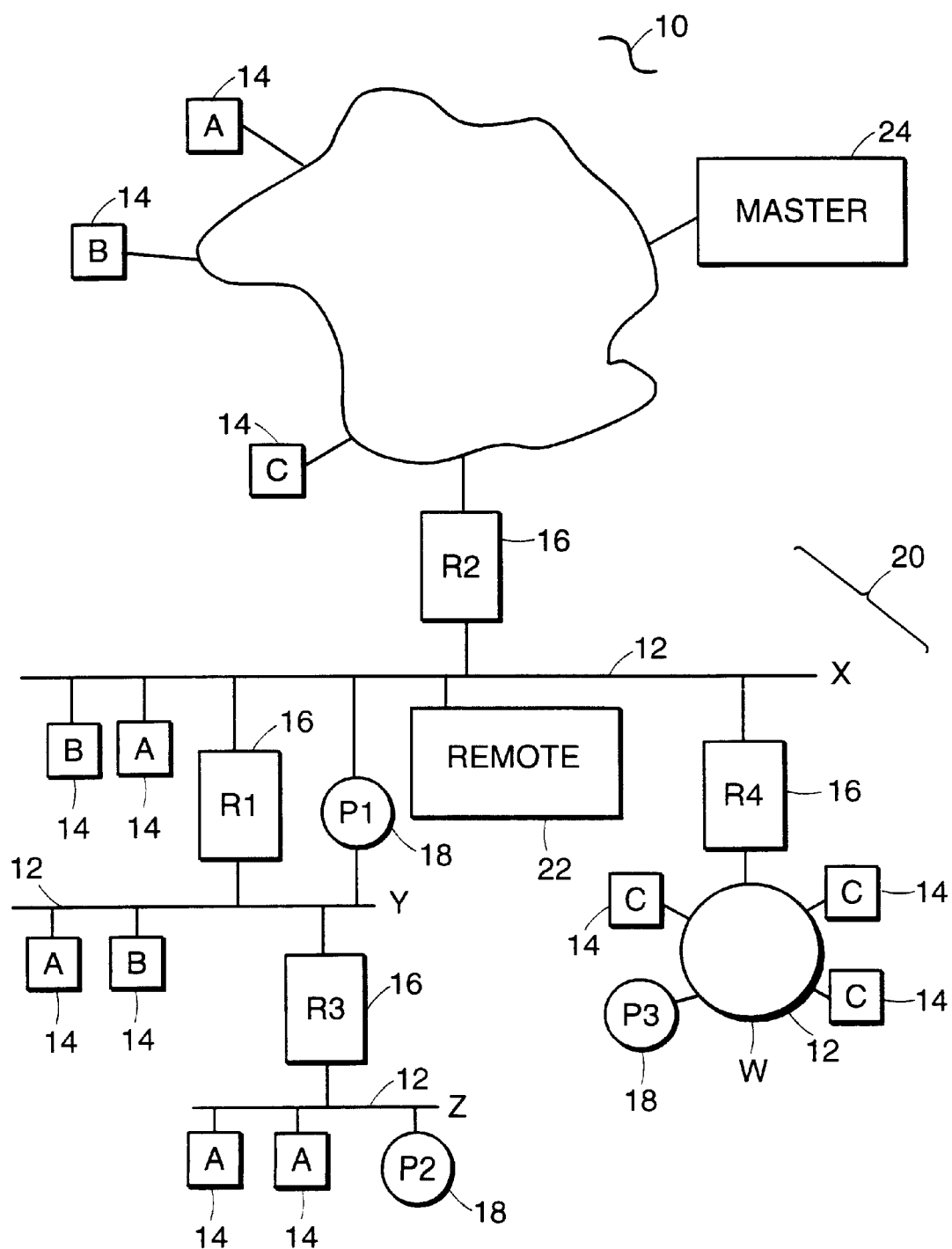
FIG. 1 is a block diagram of a representative network.

The invention is a technique for generating information desired by a user that depends on data stored in multiple workstations on various "elements". Elements are the things about which data is collected. For example, an element can be a specific component of a network, such as a segment, node, or router, or a specific component in a piece of hardware, such as a disk, a controller, or an interface card, or a software application, the output of a software application, or users of a software application. These elements all relate to computer performance data or network management data, but an element can also relate to other things as well, such as climatological data, seismic data or any data that might be distributed over a wide area.

We refer to information desired by a user and its display as a "report". Typically, a report is specific to a subset of elements, which we refer to as a "group". For example, if the workstations store data about the performance of various applications running on nearby servers, the group can be the performance data from servers running a specific application, the performance data from servers running the applications for a specific set of users, or the performance data for servers in a specific geographic region. Depending on the type of data stored and the information desired, groups can be very general. Groups can include a collection of elements, a collection of other groups, or a combination of both. Typically, each workstation stores data on elements belonging to more than one group and different workstations store data on elements belonging to the same group.

A group can specify its members by listing the complete name of each member. Alternatively, a group can specify members according to selected criteria, which can include, for example, a common feature among element names, a specific element type, or a particular characteristic of an element such as speed or bandwidth. The selected criteria can include a combination of criteria with logical connectors, i.e., and, or, not, etc.. For example, a group can specify its members by the criteria: any element whose name begins with "abc" and who is of type "local area network" ("LAN").

To generate a report, a workstation sends a request to each of the workstations that stores data. The request specifies a group name, which corresponds to a particular group, and at least one named function, which designates an algorithm for processing data. Upon receiving the request, workstations identify data on elements belonging to the group, if any, and processes the identified data using the algorithm specified by the named function. Each workstation sends the results of performing the algorithm back to the workstation that sent the request. This workstation, i.e., the one that sent the request, then consolidates the results and generates the report. The workstation that sent the request may also store data, in which case, it responds to its own request in the same way as the other workstations.

For clarity, we will refer to the workstation sending the request as the "master workstation" and the workstations storing the data as the "remote workstations". However, for a subsequent report, the workstation that is the master workstation may change, and a workstation that was previously a remote workstation may become the master workstation. In principle, every remote workstation may also be a master workstation. Also, if the master workstation stores data, it will be both a master and remote workstation.

The request sent by the master workstation need only include a group name and a single named function. User-specified parameters for the algorithm identified by the named function, if any, are included as part of the named function. Alternatively, or in addition, the request separately includes these parameters. The master workstation stores a list of all possible group names and named functions. However, the group name does not need to include the list of elements belonging to the group nor does the named function need to include instructions for carrying out the algorithm. This information is stored in the remote workstations. To identify data, each remote workstation has a group name library that lists all the elements in each group that it stores data on. Thus, upon receiving a request, each remote workstation identifies the elements belonging to the group specified by the group name. However, each remote workstation only needs to store this group name information for its own elements, i.e., the elements it stores data on, and no other workstation needs to have this information.

In the description that follows, we describe an embodiment of the invention involving data relating to network management, i.e., data about network traffic. However, the invention is quite general and can be applied to any kind of data stored on multiple workstations and relating to different elements. For example, the invention can relate to computer performance data, i.e., what software is doing, what the network is doing, what the wires between hardware are doing, what controllers in hardware are doing, what the servers are doing, how full are the disks, are there faults on the disks, what is the status information of the modems, how busy are the CPUs, etc..

The invention is also independent of where the data to be processed is accumulated and how that data is stored on the remote workstations. For example, the elements themselves can accumulate the data, e.g., a server can accumulate data about its own operations and a router can accumulate data about its own packet routing performance. Alternatively, or in addition, dedicated monitoring devices, such as probes, connected to or embedded within the elements can accumulate data about those elements. These monitoring devices themselves are also elements of the network, e.g., a probe can store data abouts its own performance or the part of the network it is currently monitoring. The data can also be the output of software running on hardware connected to the network. The hardware itself can accumulate that data or that data can be sent to or retrieved by other elements in the network. In some cases, an entity independent of the network accumulates data, and that data is then transferred to an element of the network through a computer-readable medium, e.g., a floppy disk or CD ROM, or an interaction with a user, e.g., typing at a keyboard or dictating into a microphone.

Once elements in the network have accumulated the data, they can send the data to the remote workstations, i.e., the workstations that process the data in response to the request. Alternatively, the remote workstations can retrieve the data from the elements that accumulated the data. In other cases, the remote workstations themselves accumulate the data.

The Network

Referring to FIG. 1, a representative network 10 includes segments 12, nodes 14, routers 16, and probes 18, which are all generally referred to as elements. Only one portion 20 of the network is shown in detail, and the elements of that portion are connected to a remote workstation 22. In other portions of network 10 there are other remote workstations. The network also includes a master workstation 24 that is used by a network manager.

Segments 12, which are labelled W–Z for future reference, may be implemented by any transmission medium (e.g. wire, optical fiber, Ethernet, Token Ring, etc.) to which nodes can be connected for communication with other nodes including for example, buses, coax, private lines, satellite lines, and public carrier lines, and in addition a segment may be of any topology including either a ring or a non-ring topology and it may also include multiple subnetworks.

Nodes 14, which are labelled A–C for future reference, are connected to each of the segments 12. The nodes 14 may be PC's, workstations, servers, or any other device of the type that can send and/or receive communications over the network. The nodes communicate with each other over the network using any appropriate communication protocol, e.g., TCP/IP, IPX, Appletalk, or any of the large number of other protocols. The communications are variously called conversations, dialogs, or connections. They can be connection type communications or connectionless communications, also referred to as state and stateless connections, respectively. According to a connection oriented protocol, one party establishes a connection with another party and then that connection is used to send communications between the parties. Whereas, according to a connectionless protocol, one party simply sends datagrams to the other party without first establishing a connection. The present invention applies to all types of systems.

The various segments 12 are interconnected by routers 16, which for ease of reference have been labeled R1 through R4. It should be understood, that network interconnection devices other than or in addition to routers can also be used, including, for example, bridges, gateways, multiplexors, switches, and connectors.

In the illustrated network, probes 18 are connected to some or all of the segments 10. The probes 18, which are labeled P1 through P3, are monitoring devices which collect and store data relating to the communications traffic over the network. Each probe includes a memory for storing the data that it collects through monitoring the activity (i.e., communications) on the segment of the network to which it is connected. The probes typically collect data in accordance with a known standard. One such standard, which was promulgated by the Internet Engineering Task Force, is referred to as RMON II which stands for Remote Monitoring II standard. RMON II specifies a protocol for communicating with the probe and it specifies the format of the Management Information Base (MIB), which defines the kinds of data that are stored and how to collect and retrieve that data.

A probe is meant to include any machine on a network that collects and stores information about traffic it has seen. A probe can be an individual device that is connected directly to the network, or it can be part of another device, such as a server, an intelligent hub, a router, or a switch which is part of the network. A probe can be either active or passive. In addition, a probe can be a device that looks at multiple segments. For example, as shown in FIG. 1, probe P1 is connected to both segment X and segment Y and it monitors both segments. The probe can also be a monitoring device that can roam over multiple segments. Probes that roam are typically embedded in switches which allow multiple point-to-point connections to be established. Such switches can have as many as 72 ports. Since a single probe is typically not able to monitor all of the multiple possible connections simultaneously, it operates by attaching to different connections at different times, i.e., by roaming among the connections.

Also note that the thing that the probe is connected to (i.e., what we have called the segment) can range from a single segment to a very complex subnetwork including multiple interconnected segments with multiple workstations and servers attached to those segments.

Each of the probes 18 shown FIG. 1 connects to one or more segments 12 and maintains informations about data traffic over these segments. Additional probes, which are not shown, may be embedded in the routers 16. In that case, embedded probes also accumulate and maintain information about the activity of the router 16. Together, these probes gather utilization and performance statistics, which include, among other data, the number of bytes transferred, the number of collisions, the number of errors (e.g. Ethernet errors, Token Ring hard errors, Token Ring soft errors), broadcast and multicast utilization, to name a few. Generally, the probes record and store these statistics internally in corresponding counters. Thus, for example, there will be a counter that records the total number of bytes that have been transferred over the segment since some initialization time at which the count was begun.

The data recorded by the probes in portion 20 of the network is periodically (e.g., every 10 minutes) polled by and stored in remote workstation 22. Similarly, data recorded by other probes in the network are polled and stored by other remote workstations located in other portions of the network. Every probe in the network has its data polled and stored by at least one remote workstation. Each one the remote workstations that stores data, is also equipped with software to perform operations on the data and to receive and process instructions (e.g., a multicast or a request) from master workstation 24, as is described in greater detail below.

Often, the network manager desires a report relating only to a subset of elements in the network. For example, if the network manager prepares a report for a company that uses the network, only those elements that send, receive, direct, or carry data for that company are included in the report. In general, the network manager prepares many reports, each of which may relate to a different subset of elements in the network (e.g., elements belonging to different companies that share the network). Each of these subsets defines a group, which is given a group name. The group can include as few as one element and as many as all the elements in the network. Also, a particular element can be a member of more than one group.

Referring again to FIG. 1., companies A, B, and C each own a number of nodes 14 on the network (which are denoted accordingly in FIG. 1). Segments 12 and routers 16 in the network allow these nodes to communicate with one another. The subset of elements relating to data traffic between the nodes owned by company A (and also including those nodes) defines a group, which we call "group A". Group A includes the segments denoted X, Y, and Z, and the routers denoted as R1, R2, and R3. Group A will also include other elements that are not explicitly shown in FIG. 1. However, segment 14 denoted as W and router 16 denoted as R4 are not elements of group A, since they do not carry or direct data traffic between nodes owned by company A. When preparing a report for company A relating to data traffic between their nodes, the report only includes data relating to the elements in group A.

The subset of elements relating to data traffic between nodes owned by companies B and C defines group B and group C, respectively. Table 1 lists the members of Groups A–C for the element explicitly shown in FIG. 1. Note that segments X and Y, and routers R1 and R2 are members of multiple groups. In other groups, it is also possible that a particular node be a member of multiple groups. For example, a node might be included in a group relating to a subdivision of company A as well as a group relating to company A as a whole. Furthermore, a node can be a server, a database, or any other application.

TABLE 1

| Group | Nodes | Routers | Segments | Application |
|-------|-------|---------|----------|-------------|
| A | A | R1, R2, R3 | X, Y, Z | server |
| B | B | R1, R2 | X, Y | server |
| C | C | R2, R4 | X, W | database |

In general, a group can include any subset of elements in the network according to the needs of the network manager.

Generating the Report at the Master Workstation

The network manager generates reports at the master workstation. The style and content of each report can be customized by the network manager. In general, a report relating to network management shows information relating to data traffic relating to a subset of elements in the network (i.e., a group). For example, a report may identify those segments in the group that are operating at near their bandwidth capacity, or those routers in the group that have generated the most errors, or those nodes in the group that are accessed most frequently. These are examples of "per element" data, i.e., information about particular elements. The report may also include "network-wide data", i.e., statistics relating to a number of elements in the group, for example, the total volume of bytes transmitted over all segments in the group over selected time intervals. The remote workstations store the data required to generate reports (i.e., the data received from the probes).

Generating a report requires: 1) identifying data relating to elements in a specified group; 2) processing that data to generate information for the report; and 3) producing a display of the information, e.g., a graphical, tabular, or textual display, or any display desired by the network manager. The master workstation distributes the identifying step and part of the processing steps to the remote workstations. Each remote workstation identifies the data stored within it that relates to elements belonging to the specified group, and processes that data. The data processed by each of the remote workstations is then sent to the master workstation, where it is combined and further processed to generate the information for the report.

Figure 2:
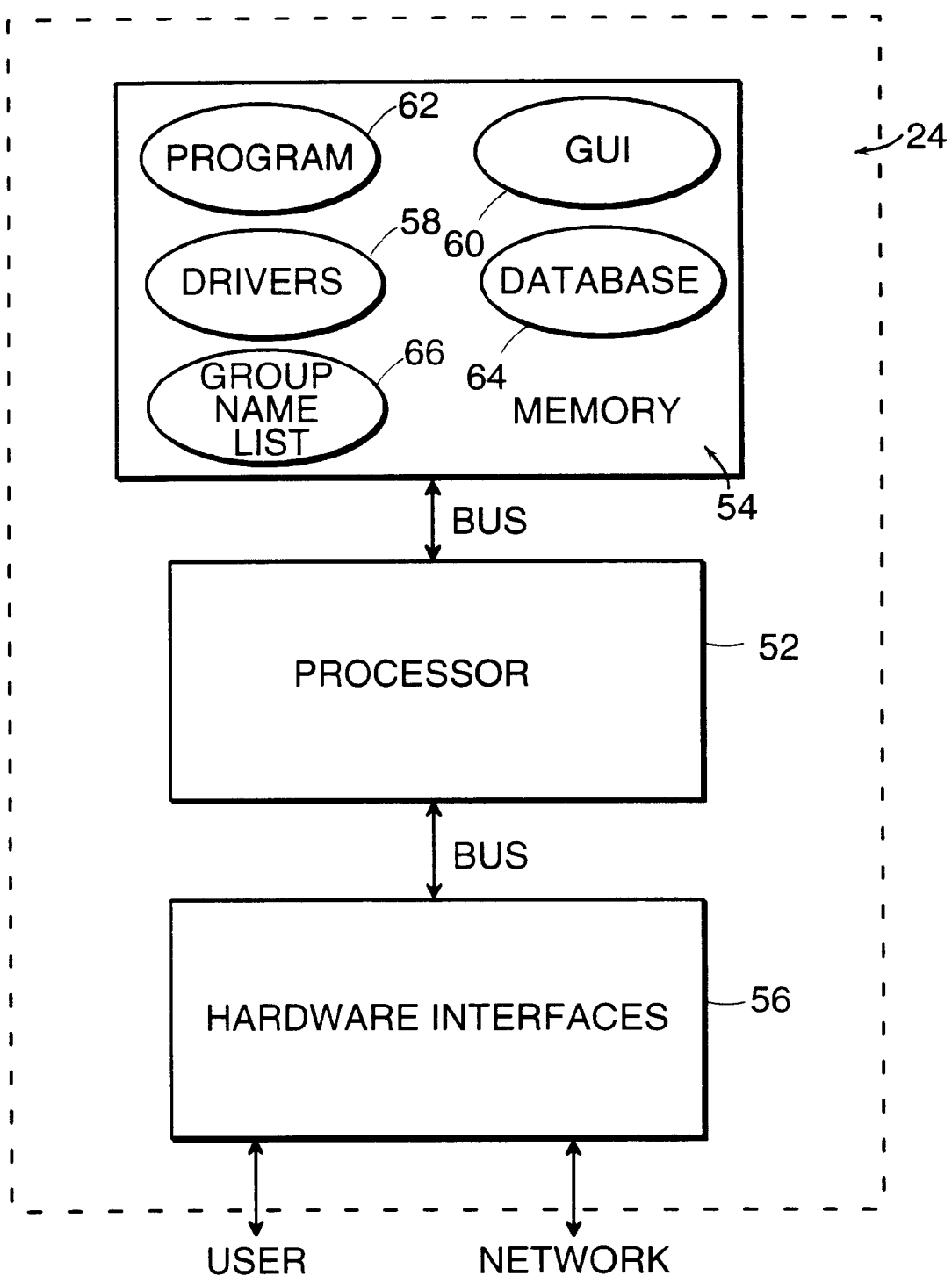
FIG. 2 is a block diagram of the components of a master workstation.
Figure 3:
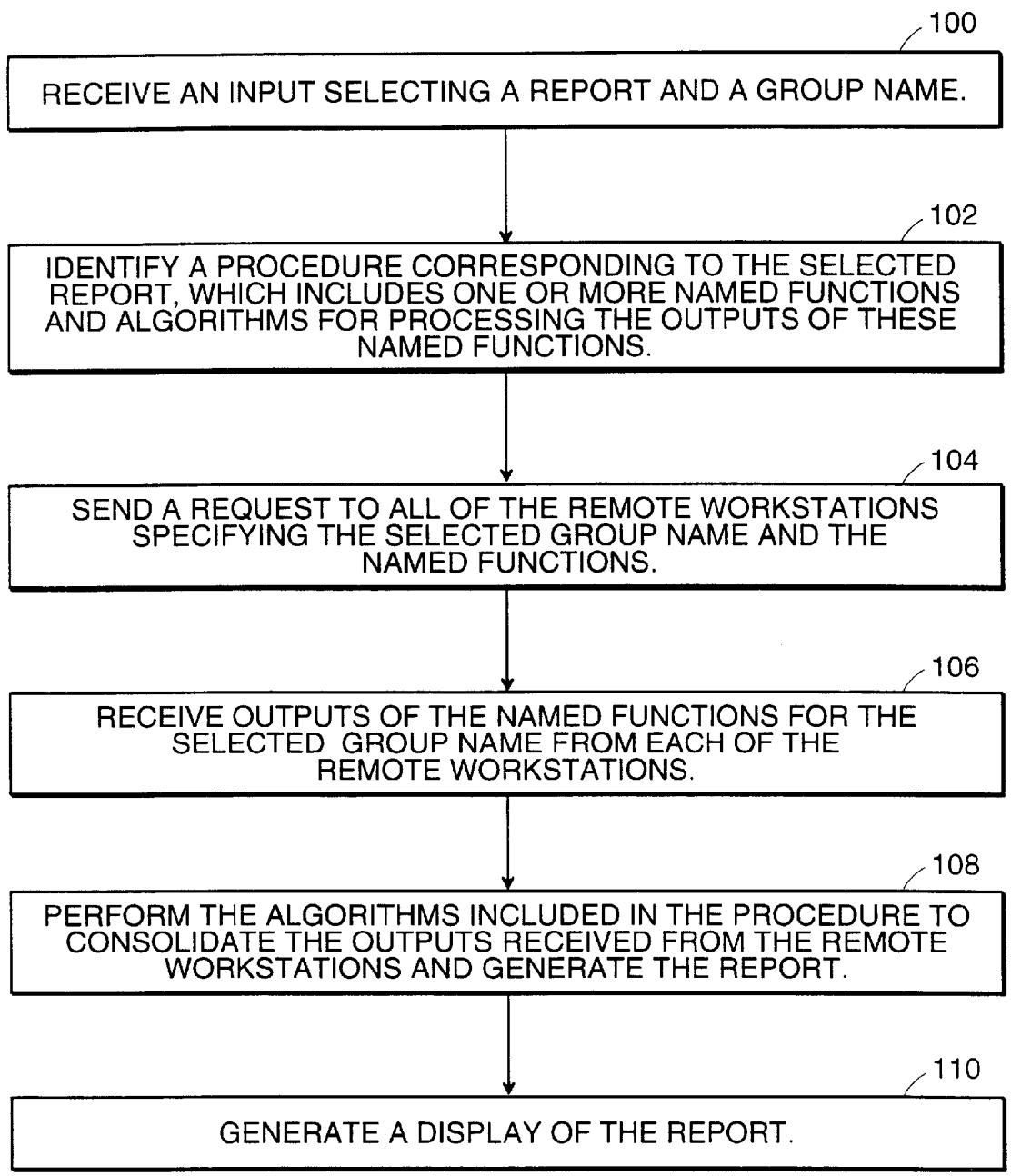
FIG. 3 is a flow chart of the steps performed by the master workstation to generate a report.

Referring to FIG. 2, master workstation 24 includes a digital processor 52, a memory (e.g., a hard disk) 54 and a series of hardware interfaces 56, including a network interface card (NIC card), a video adapter, a printer adapter, and adapters for a keyboard and a mouse. The processor is connected to the memory and the hardware interfaces by at least one bus. The memory stores driver modules 58 for each of the hardware interfaces, a graphical user interface (GUI) module 60, a program 62 for generating reports, and a database 64. The memory also stores a list of all the group names 66 that may be specified by the network manager. The driver modules execute on the processor so that the processor interacts with the hardware devices connected to the workstation. In particular, the processor receives commands from a user using a keyboard and/or mouse, outputs information to a video screen and/or printer, and communicates with other workstations on the network. The GUI module also executes on the processor and provides support for generating detailed graphical displays (e.g., graphs, pie charts, tables, etc.). Program 62, when initiated, causes the processor to perform steps to generate a report. These steps are described below and shown in FIG. 3.

First, the processor receives an input from the network manager selecting a report and a group name, which refers to a subset of elements in the network on which to base the report and is included in list 66 (step 100). The processor prompts the network manager to input parameters specific to the selected report. In particular, input parameters may include a time period for the report (e.g., report on data from the previous week), time intervals for different aspects of the report (e.g., display network wide volume at hourly intervals, display the daily leaders regarding bandwidth utilization, etc.), display specifications (e.g., display volume leaders as a bar chart, display network volume as a line graph, etc.), processing specifications (e.g., threshold values, weight collisions more heavily than bandwidth utilization when determining element performance), and other parameters. In some cases, the network manager selects reports and group names in advance, and the processor automatically executes the report generating program at the times preselected by the network manager. For example, the network manager may prepare a schedule in which the processor automatically generates reports each morning relating to network performance for the previous day for a number of preselected groups.

In the next step, the processor identifies one or more procedures corresponding to the selected report and parameters (step 102). These procedures are stored in the memory as part of the program. Each procedure includes one or more named functions that identify algorithms in the remote workstations that process data stored in the remote workstations to yield an output. The processor includes the input parameters specified by the network manager as arguments in the named functions, if they are required by the identified algorithms. For example, a name function might identify an algorithm stored in each of the remote workstations that adds together the total bytes of data transmitted over each segments belonging to the selected group during a selected time interval, and determines which of these segments carried the most data. The selected time interval is an input parameter provided by the network manager and included as an argument in the named function. The identity of this segment and the bytes of data transmitted over this segment are the output of the named function.

Each procedure also includes algorithms performed by the master workstation. These algorithms further process and consolidate the data processed by the remote workstations, i.e., the outputs to the named functions sent to the remote workstations. Continuing the above example, an algorithm performed at the master workstation might compare the outputs from all of the remote workstations and determine which segment belonging to the selected group carried the most data for the entire network. The procedure may also include algorithms for displaying the consolidated data.

After identifying the procedure, the processor sends a request to all of the remote workstations specifying the selected group name and the named functions corresponding to the procedure (step 104). The request may be sent simultaneously to all of the remote workstations, i.e., as a multicast, or alternatively, requests to the remote workstations may be sent at different times. Also, if there is more than one named function corresponding to the procedure, the request may be divided into multiple requests, each specifying only some of the named functions. The request includes input parameters for the algorithms identified by the specified named functions, if necessary, and in some cases, a deadline by which the remote workstations must respond. The input parameters are included in the request as arguments in the named functions. Alternatively, or in addition, the request includes the input parameters separately from the named function.

It is important to point out that the master workstation does not need to know which remote workstations store data required for the report. Furthermore, the master workstation does not need to know which elements belong to a particular group nor does it need to know the actual algorithms required to carry out the named functions. This information is stored in the remote workstations. In addition, with regard to group names, each remote workstation only needs to know the group names of the elements on which it stores data on.

Upon receiving the request, each remote workstation identifies data related to elements belonging to the selected group. Each remote workstation then processes the identified data according to the algorithms identified by the named functions and sends the outputs back to the master workstation. The master workstation receives the outputs and stores them in its memory (step 106). The following section describes the steps performed by the remote workstations in greater detail.

In the next step performed by the master workstation, processor 52 performs the algorithms included in the procedure corresponding to the selected report (step 108). The processor identifies the outputs from the remote workstations stored in database 64 and processes them according to the algorithm to produce the information for the report. Each output may include the parameters from the request, i.e., the selected group name, the named functions, and the parameters for the named functions. The processor identifies the outputs by using these parameters, or other keys. Finally, the processor generates a display of the report, using the GUI module stored in the memory (step 110). In other embodiments, another workstation generates the display for the report upon receiving from the master workstation the information desired for the report.

Program 62 includes many reports that can be selected by the network manager. The program also includes a module that allows the network manager to customize existing reports or generate new reports. With this module, the network manager can concatenate together different named functions stored in the program into a customized report, and store a procedure corresponding to this customized report (i.e., the named functions, the algorithms for processing the outputs to the named functions, and algorithms for displaying the report). In addition, the network manager can add new named functions from which to customize reports. To do so, the network manager inputs the named functions and the algorithms they identify, and sends them over the network to function name libraries in the remote workstations. The network manager also inputs the named functions and the algorithms for processing the outputs of the named functions in the memory of the master workstation.

In some cases, the request includes a deadline by which the remote workstations must respond to the request. The remote workstations prioritize their processing according to the deadlines from multiple requests. If a remote workstation determines that it will not complete its processing by the deadline, it sends a not complete output to the master workstation by the deadline, and stores its partial results in its memory. If the master workstation receives one or more not complete responses, it either extends the deadline by sending a supplemental response to those remote workstations that did not meet the deadline to complete its processing by a new deadline, or it generates the report with incomplete information. Which step to take is provided by the parameters input by the network manager specifying the report. Many other timing schemes are also possible.

Receiving a Request at the Remote Workstations

Figure 4:
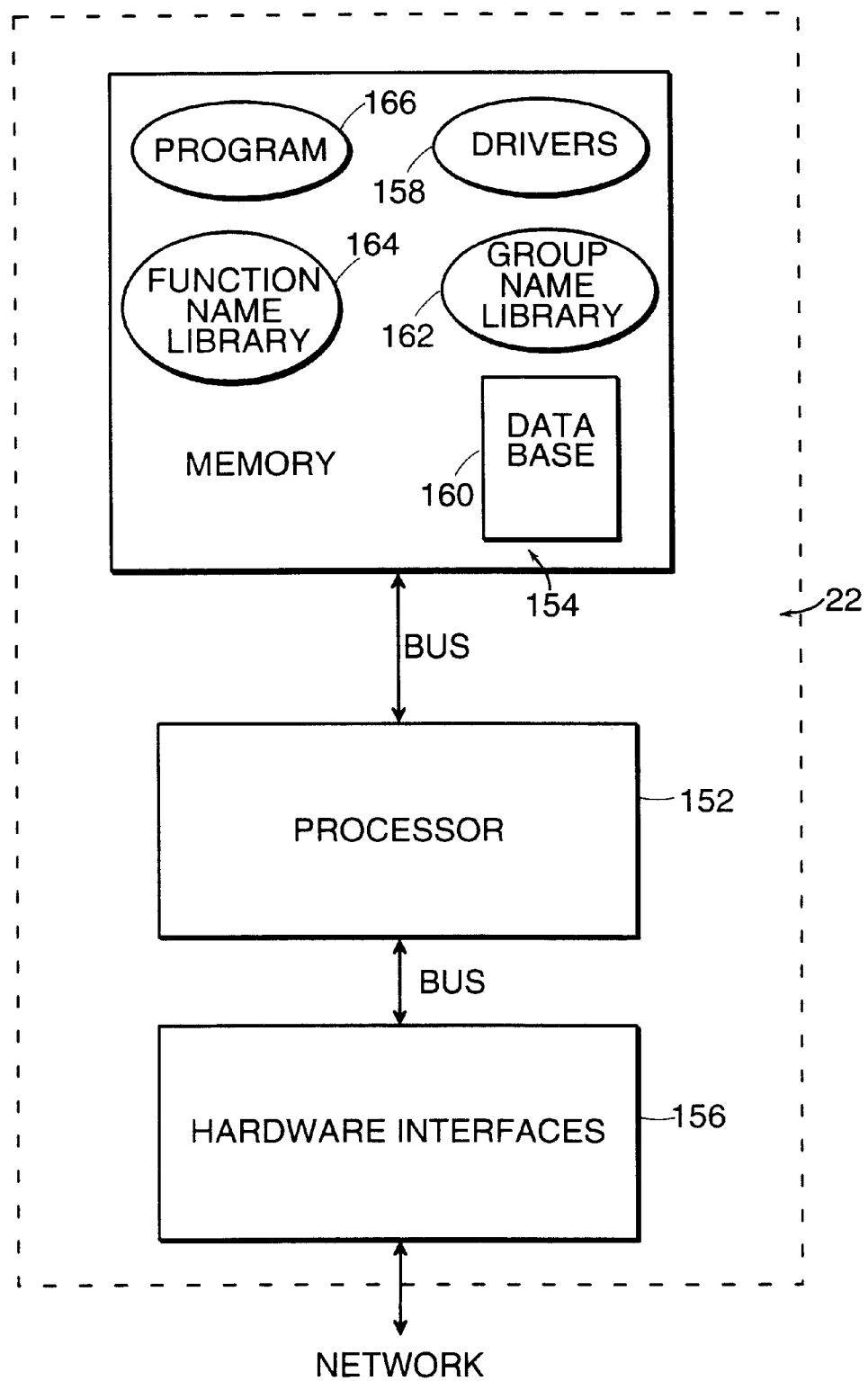
FIG. 4 is a block diagram of the components of a remote workstation.
Figure 5:
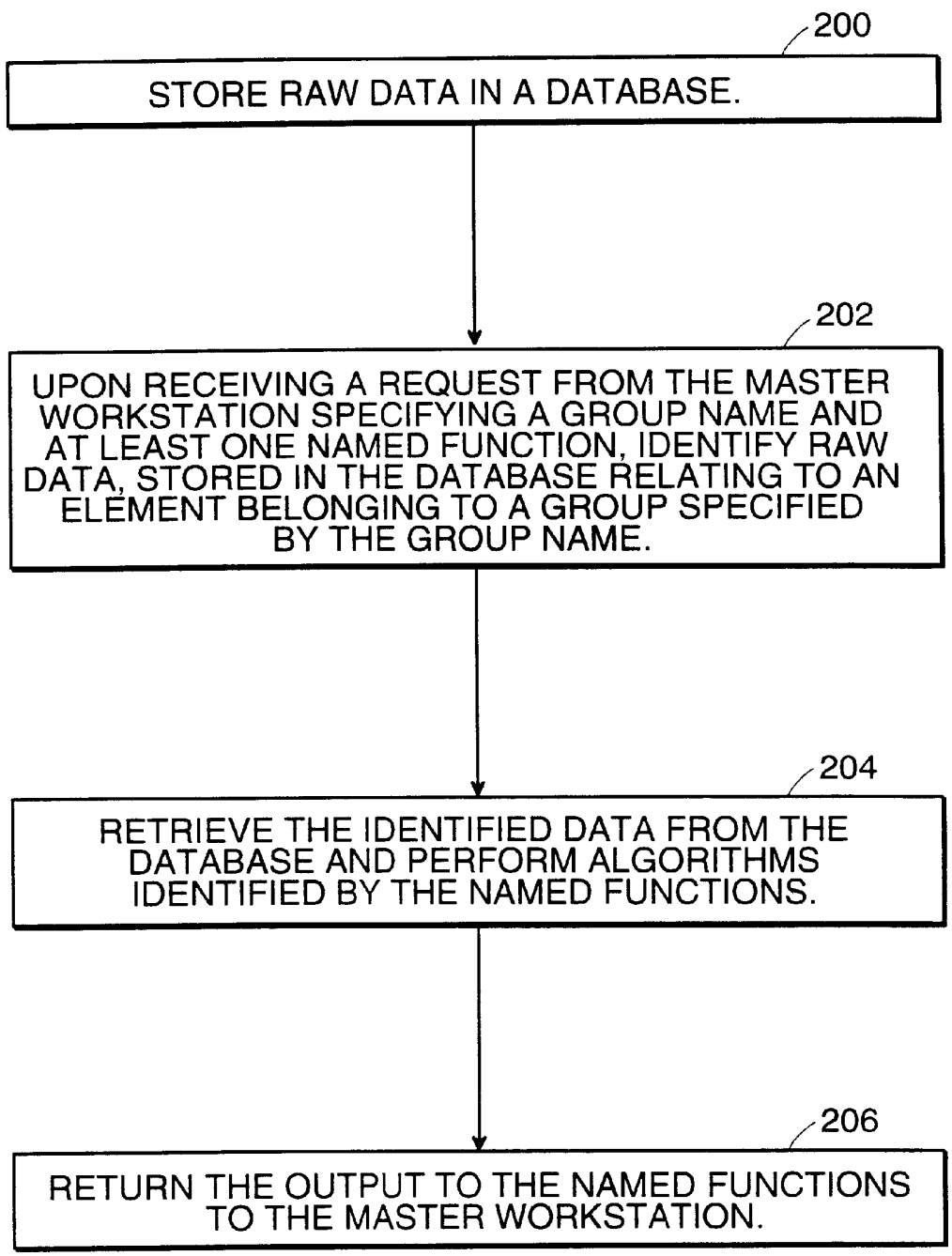
FIG. 5 is a flow chart of the steps performed by the remote workstation to generate a report.

Referring to FIG. 4, each of the remote workstations, e.g., remote workstation 22, includes a digital processor 152, a memory (e.g., a hard disk) 154 and a series of hardware interfaces 106, including a network interface card (NIC card). At least one bus connects the processor to the memory and the hardware interfaces. The memory stores driver modules 158 for each of the hardware interfaces, a program 166 for generating reports, a database 160 that stores data from probes that monitor a portion of the network, a library 162 that stores at least one group name for every element in the network monitored by the probes, and a library 164 that stores named functions and the algorithms identified by the named functions. The driver module for the NIC card executes on the processor so that the processor can communicate with other workstations on the network. Program 166 executes on the processor and causes the processor in each remote workstation to perform steps involved in generating the report. These steps are described below and shown in FIG. 5.

First, the processor periodically (e.g., every 10 minutes) polls data from the probes and stores this data in database 160 (step 200). We will refer to this data as "raw data". In other embodiments, there will be other ways to store raw data in database 160. For example, it may be a bulk store from a data collection machine or another memory medium, or periodic storing from devices other than probes. In any case, database 160 stores raw data about network traffic relating to elements in a portion of the network.

Upon receiving a request from the master workstation specifying a group name and one or more named functions, processor 152 identifies raw data stored in database 160 that belongs to elements in the group specified by the group name (step 202). Processor 152 performs this step by retrieving the group name information contained in library 162 and comparing it to the raw data stored in the database.

If processor 152 identifies no raw data, it sends a null output to the master workstation. Alternatively, in other embodiments, processor 152 simply ignores the request.

In the next step, processor 152 processes the identified data according to algorithms identified by the named functions (step 204). Processor 152 performs this step by retrieving the algorithms from library 164 and applying these algorithms to the identified data.

Finally, when the processing step is complete, the processor sends the processed data back to the master workstation (step 206). The processed data includes the information specified in the request or some other key that allows the master workstation to identify the report for which the processed data was requested.

Each remote workstation stores data on a portion of the network and in combination, the remote workstations store data on every element on the network. Thus, upon receiving the processed data from each remote workstation, the master workstation has all the information necessary for a report relating to any subset of elements in the network (i.e., a selected group). This is true even though the master workstation does not need to know which elements belong to the selected group nor the algorithms used by the remote workstations to process the raw data. Furthermore, the network manager insures that each portion of the network on which a remote workstation stores data is small enough that the remote workstation efficiently processes the data from that portion. As the network grows, the network manager adds remote workstations to store and process data relating to elements in new portions of the network.

Also, as remote workstations store data relating to new elements, information about the groups to which each new element belongs is added to the group name libraries in the remote workstations. Furthermore, if the new elements create new groups, these group names are added to the group name list in the master workstation.

Examples of Reports and Distributed Processing

The described embodiment distributes data storage among a number of remote workstation, and divides processing for report generation among a master workstation and the remote workstations. Distributing the processing among many remote workstations significantly reduces the total time required to prepare a report.

Below are examples of reports generated using the named functions "volume_leaders", "health_index_leaders", "network_wide_volume", and "network_wide_health_index". The examples illustrate processing performed by the master and remote workstations.

Volume Leaders

This report determines the top ten volume leaders for company ABC. Volume leaders are those segments in the network in the selected group that carry the greatest volume of data during a selected time interval, e.g., a particular day. To generate this information for the report, the master workstation sends a request to all of the remote workstations specifying a named function "volume_leaders", the selected time interval, and a group name "ABC".

Upon receiving the request, the processor in each remote workstation identifies stored raw volume data about segments belonging to company ABC. The raw volume data is typically stored for time intervals having a relatively fine granularity (e.g., every 10 minutes). First, the processor in each remote workstation adds together the identified data for each segment during the selected time interval to give an added value for each segment. Second, the processor sorts through the added values to determine the segments having the top ten volumes during the selected time interval. The processors for each remote workstation then returns the names of its top ten segments and their respective volumes to the master workstation as the output of the named function "volume_leaders". If there are fewer than ten segments in the selected group for a particular remote workstation, the remote workstation returns the names and volumes for all of the segments.

Once the master workstation receives the output from each remote workstation, its processor sorts through the volume values to determine the top ten volume leaders in the entire network for company ABC. The processor graphically displays the volume leaders and their respective volumes in the report.

In general, the report is not limited to the top ten volume leaders. For example, the network manager can select the top five volume leaders or the bottom ten volume leaders. To select these reports, additional parameters are provided with the named function, either as arguments for the named function or as separate parameters in the request. The named function identifies the algorithm for "volume leaders" but rather than using default parameters specifying the top ten volume leaders, the algorithm uses the additional input parameters. Similar variations in default settings and input parameters are possible in the examples that follow.

Health Index Leaders

This report determines the segments having the top ten health index values for company ABC. Health index is a relative measure of segment performance determined by a number of factors which can include bandwidth utilization, collisions, and Ethernet or Token Ring errors. For a particular segment, the value for each one of these factors is compared to one or more threshold values and assigned points based on that comparison. For example, if bandwidth utilization is less than 50%, two points are assigned, if it is between 50% and 85%, four points are assigned, and if it is over 85%, eight points are assigned. Points assigned for each factor are added together to give the health index value for the segment. The contribution (i.e., number of points) to the health index value from each of the different factors is usually recorded along with the health index value. In this way, the health index can be thought of as a vector, with respective entries of the vector equal to the number of points from each factor contributing to the health index value.

To generate the report, the master workstation sends a request to the remote workstations specifying a named function "health_index_leaders", the selected time interval, and the group name "ABC". Upon receiving the request, the processor in each remote workstation identifies stored raw data for segments belonging to company ABC. In particular, the processor identifies data about bandwidth utilization, collisions, Ethernet errors, and Token Ring errors. Then, the processor calculates the health index for each segment belonging to the company ABC. Finally, the processor determines the segments having the top ten health index values and sends those ten segment names and health index values back to the master workstation as the output of the named function "health_index_leaders".

Once the master workstation receives the output from each remote workstation, its processor sorts through the health index values to determine the top ten health index leaders in the entire network for the company ABC. The processor graphically displays the health index leaders as a bar graph in which the bar for each health leader is partitioned (e.g., by color) to display the relative contributions of the different factors, i.e., the entries of the vector.

In general, the network manager can customize the health index according to the specifics of the segments being monitored. For example, the health index can include different factors, threshold values, and point assignments. Each of these factors can be varied by adding additional input parameters to the request including the named function "health_index_leaders". The network manager can also customize health indices for other elements, such as routers. In this case, relevant factors may include CPU utilization and discard percentage.

Network-Wide Volume

This report determines the network-wide volume at selected time intervals. For example, it determines the total hourly volume during a selected day over all segments on the network belonging to the group "company ABC". To generate the report, the master workstation sends a request to all the remote workstations specifying a named function "network_wide_volume", the selected day, the selected time interval (i.e., hourly), and the group name "ABC". The processor in each remote workstations identifies the relevant raw data stored in the remote workstation, i.e., the raw volume data for segments belonging to company ABC. Then, for each hour in the selected day, the processor in each remote workstation adds together the raw volume data from each segment in the selected group and sends the result to the master workstation. Thus, the output returned to the master workstation from each remote workstation is a vector giving the total hourly volume for segments monitored by the remote workstation and belonging to company ABC.

The processor in the master workstation then adds together all of the vectors returned by the remote workstations to give another vector that is the hourly network-wide volume for the company ABC. To add vectors together, corresponding entries of each vector are added together, e.g., [1, 2, 3]+[1, 1, 2]=[2, 3, 5]. The processor graphically displays the network-wide volume as a line graph.

Network-Wide Health Index

This report determines network-wide health index statistics. For example, it determines the hourly average health index for all segments in the network belonging to the company ABC on a selected day. To generate the report, the master workstation sends a request specifying a named function "network_wide_health_index", the group name "ABC", and the selected day. Upon receiving the request, the processor in each remote workstation identifies the relevant data and determines the hourly health index for each segment monitored by the remote workstation belonging to company ABC. Since the health index is a vector that includes entries relating to different factors such as bandwidth utilization and Ethernet errors, the hourly health index is a matrix. Each column of the matrix, or alternatively, each row of the matrix, is the health index during a particular hour. Then, the processor in each remote workstation adds together the hourly health indices for each segment to give a total hourly health index. Thereafter, the processor in each of the remote workstations returns to the master workstation their respective total hourly health index and the number of segments used to determine that total, i.e., a weight.

The processor in the master workstation then determines the hourly network-wide health index. To do so, the processor first determines the total number of segments in the network belonging to the selected group by adding together all of the weights. Then, the processor adds together all of the hourly total health indices and divides that result by the total number of segments to give the hourly network-wide health index.

It is important to remember that all of the hourly health indices are matrices. To add together matrices, corresponding entries, e.g., the entry in the first column and first row of each matrix, are added together to give another matrix. To divide a matrix by a number, e.g., the sum of the weights, every entry in the matrix is divided by that number.

Reports Having Multiple Named Functions

Each of the reports in the previous examples involve only one named function. A report may also involves more than one named functions. For example, a report can include all of the results in the examples above. In this case, the request specifies all four named functions (i.e., "volume_leaders", "health_index_leaders", "network_wide_volume", and "network wide_health_index"), their respective time intervals, and the group name "ABC". Each remote workstation determines the output to each of the named functions, and then sends all of the outputs back to the master workstation to generate the composite report. To display the final information, the report may include multiple views, i.e., a view for each of volume leaders, health index leaders, network-wide volume, and network-wide health index.

Preprocessing Raw Data

In the embodiment described above, the processor in each of the remote workstations processes raw data stored in the database only after receiving a request specifying a named function. In another embodiment, the processor in each of the remote workstations preprocesses raw data and stores the preprocessed data in the database prior to receiving the request. This is done in anticipation of commonly requested information. Once a request is received specifying a named function and a group name, the processor identifies and processes either the preprocessed data or the raw data, according to the algorithm identified by the named function.

Typically, different reports, or even different information in the same report, require common operations on raw data. Having the processor in each of the remote workstations partially process raw data prior to receiving a request reduces redundant operations and increases the efficiency of report generation.

For example, since many reports typically include hourly data, the remote workstations can automatically add together the raw data stored at finer intervals (e.g., every ten minutes) into hourly intervals, and store the results. Then, when a request is received specifying a named function that involves hourly volume data, the processor retrieves the hourly volume data.

In another example, since many reports typically include top ten leaders in the health index, each remote workstation can calculate the health index of all the segments for which it stores data on a daily basis, and store the results. Then, when a request is received requesting daily health index leaders, each remote workstation need only identify the health index data for the segments in the selected group and then determine their respective top ten. These results are returned to the master workstation more quickly since each remote workstation has already determined the health index data for all of the segments prior to the request.

Figure 6:
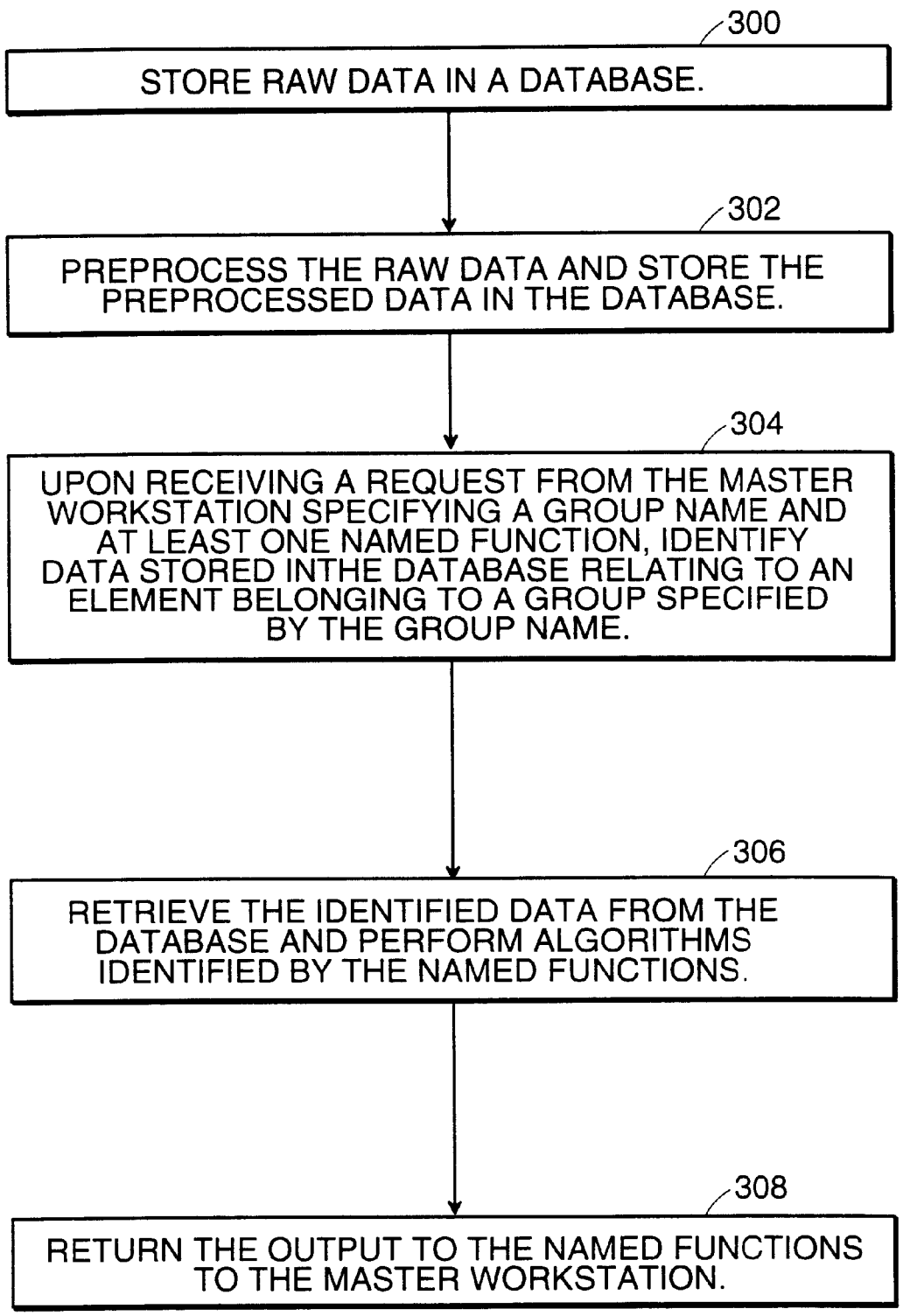
FIG. 6 is a flow chart of the steps performed by the remote workstation to generate a report in another embodiment.

To implement this embodiment, the program stored in each of the remote workstations is modified to cause the processor in the remote workstation to automatically pre-process raw data according to preprogrammed algorithms and to store that preprocessed data. In particular the program performs the following steps shown in FIG. 6. First, the processor periodically (e.g., every 10 minutes) polls data from the probes and stores this data in database 160 (step 300). Second, the processor preprocesses that data and stores the preprocessed data in the database (step 302). Third, upon receiving a request from the master workstation specifying a group name and one or more named functions, processor 152 identifies preprocessed and/or raw data stored in database 160 that belongs to elements in the group specified by the group name (step 304). The algorithms identified by the named functions and stored in library 164 specify for each piece of data whether preprocessed data or raw data is to be identified. Alternatively, the identified algorithms can process both raw and preprocessed data and specify that preprocessed data is to be identified if it is available. To determine the elements belonging to the selected group, the processor retrieves the group name information from library 162. Fourth, processor 152 processes the identified data according to algorithms identified by the named functions (step 306). In some cases, after performing these algorithms, processor 152 further processes the data according to additional algorithms. After the processing step is complete, the processor sends the processed data back to the master workstation (step 308).

OTHER EMBODIMENTS

Other embodiments are also within the scope of the invention. As indicated previously, the technique is not limited to data relating to network management. In general, the technique can be applied to data on different elements stored on multiple workstations. For example, the technique can also be applied to computer performance data, stock market data, and inventory statistics. Furthermore, though we have made a distinction between the master workstation and the remote workstations, every remote workstation, or at least some of the remote workstations, can include components and software to function as both a master and remote workstation. Thus the network manager can generate reports from a number of locations within the network.

Other aspects, advantages, and modifications are within the scope of the following claims.

What is claimed is:

1. A method implemented at a master workstation for generating a requested report from data stored in a plurality of remote workstations, said method comprising:

receiving an instruction to generate a selected one of a plurality of selectable predefined report types, each of said plurality of predefined report types having associated therewith a report generating protocol comprising (1) a first phase algorithm which when executed generates an output from input data; and (2) a second phase algorithm which when executed uses the output from the first phase algorithm and generates therefrom a report of the corresponding predefined report type;

in response to receiving said instruction, generating a request which specifies a named function that identifies the first phase algorithm for the selected predefined report type;

sending said request to said plurality of remote workstations;

receiving from each of said plurality of remote workstations a corresponding response to said request, at least some of the received responses containing a result generated by executing the first phase algorithm for the selected predefined report type at the remote workstation from which that response was received; and executing the second phase algorithm for the selected predefined report type to generate from the results received from said plurality of remote workstations the requested report.

2. The method of claim 1, wherein the requested report is network performance report for a computer network comprising a plurality of network elements.

3. The method of claim 2 wherein said request also identifies a group name, said group name identifying a subset of said plurality of network elements about which the requested report is to be generated.

4. The method of claim 2 wherein said request also identifies a group name, said group name identifying a subset of data that is collected by the remote workstations and about which the requested report is to be generated.

5. The method of claim 1 wherein said request also specifies time information which further specifies the contents of the requested report.

6. The method of claim 5 wherein said time information includes a time period which specifies a period of time for which the requested report presents network performance information.

7. The method of claim 6 wherein said time information also includes a frequency indicator which specifies a smallest period of time for which network performance information is presented in the requested report.

8. The method of claim 1 wherein said request specifies a plurality of named functions of which the first-mentioned named function is a member.

9. The method of claim 1, wherein the first phase algorithm for the selected predefined report type when executed compares a set of data to a preset value.

10. The method of claim 1, wherein the first phase algorithm for the selected predefined report type when executed computes weighted averages.

11. The method of claim 1, wherein the first phase algorithm for the selected predefined report type when executed computes aggregated values and sorts the aggregated values in order of size.

12. The method of claim 1, wherein the second phase algorithm for the selected predefined report type when executed performs vector addition.

13. The method of claim 1, wherein the second phase algorithm for the selected predefined report type when executed performs matrix addition.

14. The method of claim 1, wherein the second phase algorithm for the selected predefined report type when executed sorts aggregated values in order of size.

15. The method of claim 1, wherein each of the received responses includes an associated key, and wherein said method further comprises examining the associated key of each received response to determine which responses include results that are to be processed by the second phase algorithm for the selected predefined report type.

16. The method of claim 1, further comprising displaying the requested report on a display screen.

17. A method implemented at a local workstation for preprocessing data for a report, said method comprising:

storing a plurality of function names each of which has associated therewith a corresponding different report generating algorithm which includes a preprocessing part and a post-processing part, wherein a corresponding report is generated for any one of said plurality of function names by first running the preprocessing part associated with that function name on an appropriate set of input data to produce intermediate data followed by running the post-processing part associated with that function name on the intermediate data to generate the corresponding report;

receiving from a remote workstation a request specifying a function name and time information, said specified function name being one of the plurality of stored function names;

retrieving data from a data storage, said retrieved data being data that is required as input for the specified function name and that satisfies conditions determined by the specified time information;

executing the preprocessing part associated with the specified function name to generate from the retrieved data a first set of intermediate data; and sending a response to the remote workstation, said response including the first set of intermediate data for further processing by the post-processing part associated with the specified function name to generate a requested report associated with the specified function name.

18. The method of claim 17 further comprising storing at the local workstation the preprocessing parts of the report generating algorithms associated with said plurality of function names.

19. The method of claim 17 wherein said response also includes a key identifying said request as the request to which said response corresponds.

20. The method of claim 17, wherein the retrieved data is network performance data for a computer network comprising a plurality of network elements.

21. The method of claim 20 wherein said request also identifies a group name, said group name identifying a subset of said plurality of network elements about which the requested report is to be generated.

22. The method of claim 17 wherein the data storage stores network performance data for a plurality if network elements of a computer network and wherein said request also identifies a group name, said group name identifying a subset of the data that is stored within said data storage and about which the requested report is to be generated.

23. The method of claim 17 wherein the received request also includes a deadline by which time the local workstation must respond to the request.

24. The method of claim 17 wherein said time information includes a time period which specifies a period of time for which the response is to provide network performance information.

25. The method of claim 24 wherein said time information also includes a frequency indicator which specifies a smallest period of time for which the response provides network performance information.

26. The method of claim 17 wherein said request specifies a plurality of function names of which the first-mentioned function name is a member, wherein each of said plurality of function names identifies a corresponding one of said plurality of report preprocessing parts, and wherein the executing step comprises executing all of the identified report preprocessing parts to generate from the retrieved data said first set of intermediate data.

27. The method of claim 17, wherein the identified report preprocessing part when executed compares a set of data to a preset value.

28. The method of claim 17, wherein the identified report preprocessing part when executed computes weighted averages.

29. The method of claim 17, wherein the identified report preprocessing part when executed computes aggregated values and sorts the aggregated values in order of size.

30. A computer program stored on a computer-readable media for causing a computer to perform the functions of:

receiving an instruction to generate a selected one of a plurality of selectable predefined report types, each of said plurality of predefined report types having associated therewith a report generating protocol comprising (1) a first phase algorithm which when executed generates an output from input data; and (2) a second phase algorithm which when executed uses the output from the first phase algorithm and generates therefrom a report of the corresponding predefined report type;

in response to receiving said instruction, generating a request which specifies a named function that identifies the first phase algorithm for the selected predefined report type;

sending said request to a plurality of remote workstations;

receiving from each of said plurality of remote workstations a corresponding response to said request, at least some of said corresponding responses containing a result of executing the first phase algorithm for the selected predefined report type at the remote workstation from which the corresponding response was received; and executing the second phase algorithm for the selected predefined report type to generate from the results received from said plurality of remote workstations the requested report.

31. A computer program stored on a computer-readable media for causing a computer to perform the functions of:

storing a plurality of function names each of which has associated therewith a corresponding different report generating algorithm which includes a preprocessing part and a post-processing part, wherein a corresponding report is generated for any one of said plurality of function names by first running the preprocessing part associated with that function name on that a set of input data to produce intermediate data followed by running the post-processing part associated with that function name on the intermediate data to generate the corresponding report;

receiving from a remote workstation a request specifying a function name and time information, said specified function name being one of the plurality of stored function names;

retrieving data from a data storage, said retrieved data being data that is required as input for the specified function name and that satisfies the specified time information;

executing the preprocessing part associated with the specified fuiction name to generate from the retrieved data a first set of intermediate data; and sending a response to the remote workstation, said response including the first set of intermediate data for further processing by the post-processing part associated with the specified function name to generate a report associated with the specified function name.

* * * * *